United States Patent

[11] 3,547,298

| [72] | Inventor | Roeland Versluis<br>The Hague, Netherlands |
| --- | --- | --- |
| [21] | Appl. No. | 752,949 |
| [22] | Filed | Aug. 15, 1968 |
| [45] | Patented | Dec. 15, 1970 |
| [73] | Assignee | Shell Oil Company<br>New York, N.Y.<br>a corporation of Delaware |
| [32] | Priority | Aug. 30, 1967 |
| [33] | | Netherlands |
| [31] | | 6711947 |

[54] APPARATUS FOR CLOSING A PRESSURE VESSEL
4 Claims, 4 Drawing Figs.

[52] U.S. Cl. ..................................................... 220/3,
220/5, 220/46, 220/55

[51] Int. Cl. ..................................................... B65d 7/02,
B65d 53/02, B65d 45/28
[50] Field of Search ........................................... 220/3.14,
5.5A, 46, 55.3, 57

[56] References Cited
UNITED STATES PATENTS

| 2,967,640 | 1/1961 | Roberts ....................... | 220/55.3 |
| --- | --- | --- | --- |

FOREIGN PATENTS

| 1,137,116 | 5/1957 | France ......................... | 220/57 |
| --- | --- | --- | --- |
| 208,047 | 10/1966 | Sweden ......................... | 220/14 |

Primary Examiner—George E. Lowrance
Attorneys—J. H. McCarthy and Freling E. Baker ABSTRACT: A safety closure apparatus comprises an axially expandable cylindrical member intermediate a pressure releasable cover to bias sealing areas between said cover and an opening in a pressure vessel toward one another.

PATENTED DEC 15 1970  3,547,298

INVENTOR:
ROELAND VERSLUIS
BY: Frelinq E Baker
HIS ATTORNEY 3,547,298

APPARATUS FOR CLOSING A PRESSURE VESSEL

BACKGROUND OF THE INVENTION

The invention relates to an apparatus for closing a pressure vessel having a lid which can open outwards and a ring gasket, by means of a safety closure means which is connected, at least indirectly, to the pressure vessel in a fixed way.

Often, in technical practice one wants to protect a vessel, e.g., a reactor or a pump system against too-high a pressure of the medium it contains. A well-known safety measure is to provide the pressure vessel with a lid which open outwards when a critical value of the pressure is exceeded, so that the danger of an explosion of the entire pressure vessel is eliminated. A lid of this type is an important protection especially when the pressure increases by jumps.

A common safety closure consists of a clamping device, such as a lever system which is connected to the pressure vessel and which exerts a force on the lid so that a ring gasket between pressure vessel and lid is pressed against its seat. The force of the clamping device on the lid may be adjustable, e.g., by straining a spring or by tightening a draw bolt. Relief of the lid when the critical value of the pressure is exceeded may be brought about by rupture of a lock pin of a suitably chosen strength in the clamping device.

An important drawback of the above-mentioned apparatuses is that the force by which the ring gasket is pressed against its seat decreases with increasing pressure in the pressure vessel, which may cause leakage. This situation occurs at the beginning of a process when the pressure vessel is being filled or when at a later stage the pressure is increased. Due to the increase in the outward force acting on the lid, the load on the clamping device increases. As a result of elastic bending and elongation the rim of the lid moves slightly outwards, resulting in a decrease in the force by which the ring gasket is pressed against its seat. This makes it necessary to increase the force of the clamping device on the lid. However, in consequence thereof the moment at which the lid will open when the pressure increases becomes uncertain. For example, when a lock pin is used it is not known exactly in such a case what part of the total load on the lock pin is attributable to the contents of the pressure vessel.

SUMMARY OF THE INVENTION

The invention now provides the means to eliminate the above-mentioned drawbacks.

According to the invention an apparatus for closing a pressure vessel having a lid which can open outwards and a ring gasket, by means of a safety closure which is connected, at least indirectly, to the pressure vessel in a fixed way, is fitted with an expandable intermediate piece between the ring gasket and the lid, or between the ring gasket and the pressure vessel, which is connected in a leakproof way to the lid or to the pressure vessel, respectively, the area of the largest section through the said intermediate piece perpendicular to the center line thereof being larger than the area enclosed within the ring gasket.

By this apparatus it is ensured that the force by which the ring gasket is pressed against its seat increases with increasing pressure in the pressure vessel. This is due to the force which the medium in the pressure vessel exerts on the intermediate piece. The intermediate piece being expandable, it might become longer by the action of this force. The safety locking device opposes this extension. The intermediate piece protrudes beyond the area enclosed within the ring gasket. The resultant of the force exerted in this ring gasket by the medium in the pressure vessel in the direction of the center line of the intermediate piece can be compensated only by the safety closure via the lid and the ring gasket, so that the force by which the ring gasket is pressed against its seat increases with increasing pressure. The closure is not endangered and no alterations to the setting of the clamping device on the lid are needed. The safety closure should be attached to the pressure vessel in such a way that a displacement of the lid as a result of the expandability of the intermediate piece is opposed sufficiently. For this reason the safety closure should be connected to the pressure vessel—either directly or indirectly—in a fixed manner. An indirect fixed connection is obtained for instance by connecting the safety closure to the foundations of the pressure vessel. Generally, sufficiently strong beams or bars will be used for the safety closure. A part subjected to a tensile force may, however, also consist of a tensioned chain. It has been found advantageous for the area of the largest section through the intermediate piece to be approximately twice as large as the area enclosed within the ring gasket.

The required expandability in the direction of the center line may very suitably be obtained by providing for the intermediate piece to contain a bellows. The bellows should of course be made sufficiently strong for it to be able to resist the pressure in the vessel. It is even possible for the intermediate piece to consist mainly of one section of a bellows. This bellows protrudes beyond the ring gasket and is sufficiently expandable for the greater part of the force which the pressure in the vessel exerts on the bellows in the direction of the center line to be transmitted to the ring gasket.

The invention can be used for pressure vessels filled with a gaseous medium or with a liquid medium and in any pressure range that may occur. In the case of cylindrical pressure vessels the lid with safety closure and with the intermediate piece may be the closing device at the end of the cylinder. It is also possible for the apparatus according to the invention to be placed on a branch connected to the pressure vessel in a fixed manner. In that case the center line of the intermediate piece coincides with that of the branch. It is also possible to protect a pipeline by an apparatus according to the invention, e.g., by fitting the pipeline with a branch in the manner as described hereinbefore.

The invention will now be further elucidated with the aid of some diagrammatic representations of embodiments of the invention. However, the invention is by no means limited to these embodiments.

BRIEF DESCRIPTION OF THE DRAWINGS

FIG. 1 shows a small section of the wall of a pressure vessel. This may, e.g., be a cylindrical vessel. A lid or cover 2 fits a ring gasket 3 which is located in an annular member or piece of metal 4 in which there is a groove. A lever 5, capable of pivoting about point 6, can exert a force on lid or cover 2 by means of piece 7, by tightening a screw 8 about a tie rod 9. A lock pin 10 secures the tie rod. Fitted to the annular member are a flat collar 11 and a bellows or expandable sleeve member 12. Member 12 may also be a flexible accordion tube. Flange 13 provides a leakproof connection with pressure vessel 1 such as by suitable seal means 26. In this case members 4, 11, 12 and 13 form the intermediate portion of the closure means. The lever system is connected in a fixed manner to flange 13 which in turn is connected in a fixed manner such as by studs 27 to pressure vessel 1.

Figure 1:
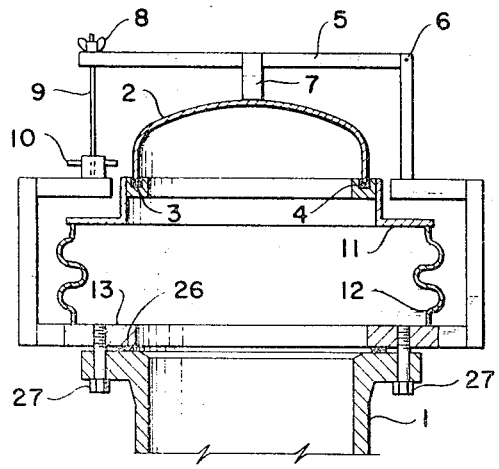
FIG. 1 is a side view in section of a preferred embodiment of the present invention attached to an opening in a pressure vessel.

When the pressure vessel is closed, tightening of screw 8 will cause a desired force to be exerted on ring gasket 3 by which this ring gasket is pressed against its seat. When the pressure of the medium in the pressure vessel increases the force which is exerted by lid 2 on lever 5 increases. As a result of elastic deformation of lever 5 and lid 2 the rim of the lid will move slightly upwards, which would cause the force by which the ring gasket 3 is pressed against its seat to decrease rapidly if intermediate piece had not been fitted. However, via the flat collar 11 the pressure of the medium in the pressure vessel exerts an upward force on ring gasket 3 because bellows 12 can easily expand in the vertical direction. When the pressure increases further this force on the gasket increases, so that leakage along the gasket will not occur. The force on the gasket increases when collar 11 is larger, so that for each application the force can be chosen so as to suit that application. It is not necessary for collar 11 to be flat, it can also be conical or curved. Lock pin 10 will break when the total force exerted on it exceeds a critical value. The lid then opens and the pressure is released. It is not necessary when the pressure increases to make any alterations to the pretensioning of the lock pin effected, when the vessel was being closed, by tightening screw 8.

Figure 2:
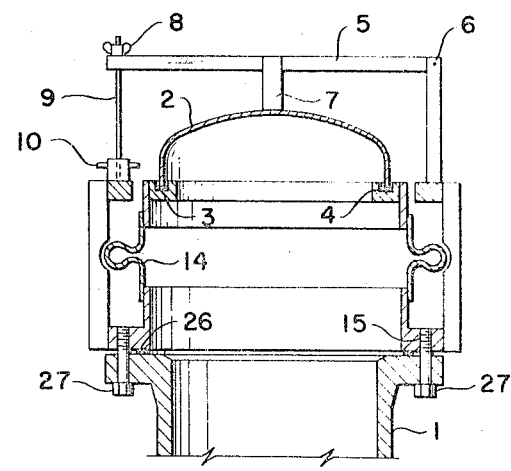
FIG. 2 is a side view in section of a second embodiment of the present invention attached to a pressure vessel opening.

In FIG. 2 notations which have been used previously denote the same parts. To the annular member 4 is attached a bellows or expandable 14 which is fitted in a leakproof way by means of flange 15 and seal means 28 on the pressure vessel. The bellows consists of one section. Here members 4, 14 and 15 form the intermediate section of the closure means. The lever system is connected in a fixed manner to flange 15, which in turn is connected in a fixed manner to the pressure vessel 1 such as by studs 29. Since bellows 14 is sufficiently expandable in the vertical direction, here the pressure of the medium in the pressure vessel exerts an upward force on ring gasket 3 via the protruding uppermost rim of bellows 14.

Figure 3:
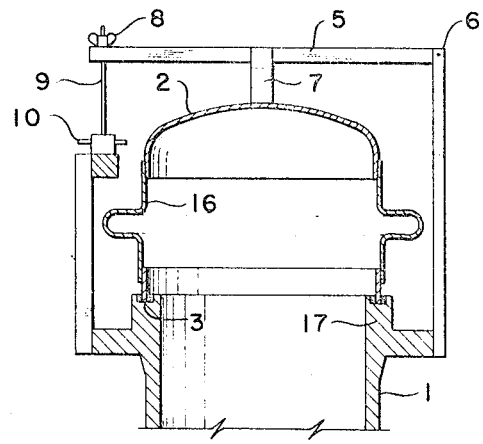
FIG. 3 is a side view of a third embodiment of the present invention attached to an opening in a pressure vessel.

In FIG. 3 notations which have been used previously denote the same parts. Bellows 16 is fixed in a leakproof way to lid 2. The top of pressure vessel 1 is provided with an annular member of metal 17 in which there is a groove. Located herein is a ring gasket 3. The underside of bellows or expandable sleeve member 16 fits ring gasket 3. Here the intermediate section consists of bellows 16 and is located between the lid and the ring gasket. Since bellows 16 is sufficiently expandable in the vertical direction, here the pressure of the medium in the pressure vessel exerts a downward force on ring gasket 3 via the protruding lowermost rim of bellows 16. If the force on the safety closure becomes too great because the pressure increases further, then lock pin 10 will break and the lid with the bellows will open.

Figure 4:
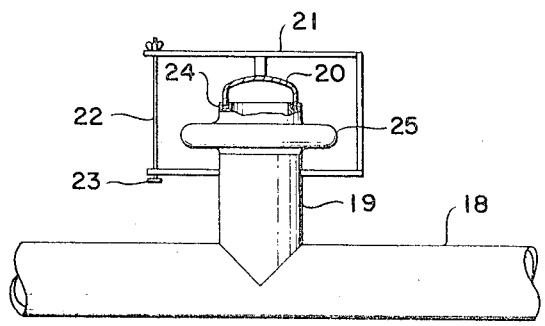
FIG. 4 is a longitudinal view in section of a pipeline to which is attached an apparatus of the present invention.

In FIG. 4 member 18 is a pipeline containing a medium under pressure for transport purposes. This pipeline has a branch 19 with a lid 20. A lever system 21 with a tie rod 22 and lock pin 23 exerts a pressure on lid 20 as a result of which ring gasket 24 is pressed against its seat. Between lid 20 and branch 19 there is a bellows 25. In the way as described hereinbefore, when the pressure increases the ring gasket will be compressed to a larger extent and when the pressure exceeds the permissible value lock pin 23 will break and lid or cover 20 will open.

I claim:

1. An improved pressure vessel safety closure means for closing an opening in a vessel, said closure means comprising:
   a cover member of sufficient size to close and seal said opening;
   releasable latch means releasably biasing said cover member toward said opening;
   an annular member adapted to sealingly engage said vessel around the opening in said vessel;
   an expandable intermediate sleeve member operatively positioned between said cover member and said annular member to form a gastight closure;
   said expandable sleeve member having an enlarged section;
   said enlarged section being taken through said intermediate sleeve member in a direction perpendicular to the center line thereof is larger than the area of said sealed opening of said vessel; and
   said sleeve member being responsive to gas pressure therein to expand axially, thereby biasing one end thereof toward said cover member and the other end thereof toward the opening in said vessel.

2. A safety closure apparatus for closing an opening in a pressure vessel or the like, said apparatus comprising:
   an end member of sufficient size to close and seal said opening;
   releasable latching means engaging and biasing said end member toward said opening in said vessel;
   an annular member surrounding the opening vessel;
   an expandable intermediate sleeve member having one end thereof connected to one of said end member and said annular member;
   said sleeve member being axially expandable in response to pressure therein; and
   a ring gasket sealing positioned between the other end of said intermediate member and the other of said end member and said annular member.

3. The apparatus of claim 2 wherein the greatest cross-sectional area of said sleeve member is greater than the area enclosed within said ring gasket.

4. The apparatus of claim 2 wherein said intermediate member comprises a bellows.